United States Patent
Shin et al.

(10) Patent No.: US 11,085,991 B1
(45) Date of Patent: Aug. 10, 2021

(54) TEST NODE-BASED WIRELESS POSITIONING METHOD AND DEVICE THEREOF

(71) Applicant: SOONGSIL UNIVERSITY RESEARCH CONSORTIUM TECHNO-PARK, Seoul (KR)

(72) Inventors: Yo An Shin, Seoul (KR); Kwang-Yul Kim, Seoul (KR); Seung-Woo Lee, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 464 days.

(21) Appl. No.: 16/313,891

(22) PCT Filed: Dec. 2, 2016

(86) PCT No.: PCT/KR2016/014136
§ 371 (c)(1),
(2) Date: Dec. 28, 2018

(87) PCT Pub. No.: WO2018/004081
PCT Pub. Date: Jan. 4, 2018

(30) Foreign Application Priority Data

Jun. 29, 2016 (KR) ........................ 10-2016-0081545

(51) Int. Cl.
*G01S 5/02* (2010.01)
*G01S 5/14* (2006.01)

(52) U.S. Cl.
CPC ........ *G01S 5/0242* (2013.01); *G01S 5/02529* (2020.05); *G01S 5/14* (2013.01)

(58) Field of Classification Search
CPC ........ G01S 5/02; G01S 5/0242; G01S 5/0252; G01S 5/14
See application file for complete search history.

(56) References Cited

U.S. PATENT DOCUMENTS

2012/0184297 A1   7/2012  Kim et al.
2014/0153424 A1   6/2014  Shin et al.

FOREIGN PATENT DOCUMENTS

KR   10-2010-0077654 A   7/2010
KR   10-2011-0035888 A   4/2011
(Continued)

OTHER PUBLICATIONS

K.-Y. Kim et al., Test node-based WCL algorithm for wireless sensor networks, 2016 Eighth International Conference on Ubiquitous and Future Networks (ICUFN). p. 418-423, Jul. 2016 (Year: 2016).*

(Continued)

*Primary Examiner* — Bernarr E Gregory
*Assistant Examiner* — Fred H Mull
(74) *Attorney, Agent, or Firm* — Revolution IP, PLLC

(57) ABSTRACT

The present invention relates to a test node-based wireless positioning method and a device thereof, the method comprising the steps of mapping and storing the number and position coordinates of anchor nodes, which are within a set distance from a test node, for each of a plurality of test nodes set at uniform intervals in a space formed by a plurality of anchor nodes; acquiring each position coordinate of the anchor nodes, which are within the set distance from a unknown node to be positioned; comparing each of the acquired position coordinates of the anchor nodes and the position coordinates of the anchor node mapped on the test nodes, so as to select the test nodes of which the number of position coordinates coinciding with the anchor nodes greater than a threshold; and estimating the position of the unknown node by using the position coordinates of the selected test nodes.

10 Claims, 7 Drawing Sheets

(56) References Cited

FOREIGN PATENT DOCUMENTS

KR     10-2012-0115895 A     10/2012
KR     10-1350389 B1     1/2014

OTHER PUBLICATIONS

NPL—English translation of KR20100077654A (Year: 2021).*
NPL—English translation of KR20110035888A (Year: 2021).*
NPL—English translation of KR20120115895A (Year: 2021).*
International Search Report for PCT/KR2016/014136 dated Jan. 20, 2017 from Korean Intellectual Property Office.

* cited by examiner

TEST NODE-BASED WIRELESS POSITIONING METHOD AND DEVICE THEREOF

TECHNICAL FIELD

Background Art (a) Field of the Invention

The present invention relates to a test node-based wireless positioning method and device thereof, and more particularly, to a test node-based wireless positioning method and device capable of improving wireless positioning performance.

(B) Description of the Related Art

A wireless positioning technology for a Wireless Sensor Network (WSN) is actively studied in various fields at present. Generally, a Global Positioning System (GPS) method that provides highly accurate location information is most commonly used as an outdoor wireless positioning method.

However, there is a problem that a sensor node in WSN environment cannot mount all GPS chips due to a size, a cost, and power limit, and many signals are lost in indoor environment or a shaded region. Therefore, there is a demand for a technology capable of providing highly accurate position information with low power and low complexity in the room.

In order to solve the constraint, research on a Wireless Centroid Localization (WCL) algorithm is actively under way. In general, if only coordinate information of the anchor node is known, the WCL algorithm can estimate coordinate information of a unknown node whose position is not known through a simple wireless positioning operation and thus, the WCL algorithm is efficient in terms of speed and resource usage.

In addition, a WCL algorithm has been proposed which improves performance more than a general WCL algorithm that uses coordinates of only an anchor node and which uses a test node. A technology that uses the test node significantly reduces a wireless positioning error occurring in a corner and an edge region of a WSN space, and thus, the overall wireless positioning performance is improved.

However, since the test node-based WCL algorithm searches only a test node having a condition that perfectly matches coordinates of the anchor node measured at a unknown node and estimates a position by averaging the coordinates of the searched test node, there is a problem that the wireless positioning performance is limited.

A technology that becomes a background of the present invention is disclosed in Korean Patent No. 1350389 (published on Jan. 16, 2014).

DISCLOSURE

Technical Problem

An object of the present invention is to provide a test node-based wireless positioning method and device thereof capable of improving wireless positioning performance.

Technical Solution

The present invention provides a wireless positioning method including the steps of mapping and storing the number and position coordinates of anchor nodes, which are within a set distance from a test node, for each of a plurality of test nodes set at uniform intervals in a space formed by a plurality of anchor nodes; acquiring respective position coordinates of the anchor nodes which are within the set distance from a unknown node to be positioned; comparing each of the acquired position coordinates of the anchor nodes and the position coordinates of the anchor nodes mapped to the test nodes so as to select the test nodes of which the number of position coordinates of the anchor nodes matching each other is greater than a threshold; and estimating a position of the unknown node by using the position coordinates of the selected test nodes.

Here, the threshold can be set for each of the plurality of test nodes and is set to a value that is obtained by subtracting a predetermined common constant from the number of anchor nodes which are mapped to the test nodes.

In addition, the step of estimating the position of the unknown node can estimate the position of the unknown node, based on a value that is obtained by applying respective weighted values to the position coordinates of the selected test nodes as represented by a following equation.

$$P(x, y) = \frac{\sum_{j=1}^{N} w_j T_j(x, y)}{\sum_{j=1}^{N} w_j}$$

Here, $P(x,y)$ denotes the position of the unknown node, $T_j(x,y)$ denotes position coordinates of a jth test node among the selected test nodes, N denotes the number of the selected test nodes, $W_j$ denotes a weighted value that is applied to the jth test node.

In addition, the weighted value can be calculated by $c2/c1$, $c1$ can denote the number of anchor nodes within the set distance from the test node, and $c2$ can denote the number of position coordinates of the anchor nodes matching each other.

In addition, the anchor nodes within the set distance from the unknown node can correspond to anchor nodes in which a strength of a signal that is received from the unknown node among the plurality of anchor nodes is greater than or equal to the threshold.

In addition, the present invention provides a wireless positioning device including a test node setting unit that maps and stores the number and position coordinates of anchor nodes, which are within a set distance from a test node, for each of a plurality of test nodes set at uniform intervals in a space formed by a plurality of anchor nodes; an anchor node information acquisition unit that acquires respective position coordinates of the anchor nodes which are within the set distance from a unknown node to be positioned; a test node selection unit that compares each of the acquired position coordinates of the anchor nodes and the position coordinates of the anchor nodes mapped to the test nodes so as to select the test nodes of which the number of position coordinates of the anchor nodes matching each other is greater than a threshold; and a position estimation unit that estimates a position of the unknown node by using the position coordinates of the selected test nodes.

Advantageous Effects

According to the present invention, it is possible to improve wireless positioning performance by estimating a position of a unknown node using coordinates of a test node whose positional correlation is more than a threshold. In addition, by giving a high weighted value to the coordinates of the test node having a high correlation, more reliable and highly accurate positioning information can be provided.

MODE FOR INVENTION

Hereinafter, embodiments of the present invention will be described in detail with reference to the accompanying drawings such that those skilled in the art to which the present invention belongs can easily implement the present invention.

The present invention relates to a wireless positioning method and a device thereof and provides a method for improving wireless positioning performance more than before in a wireless positioning technology based on a test node-based Wireless Centroid Localization (WCL) algorithm.

Figure 1:
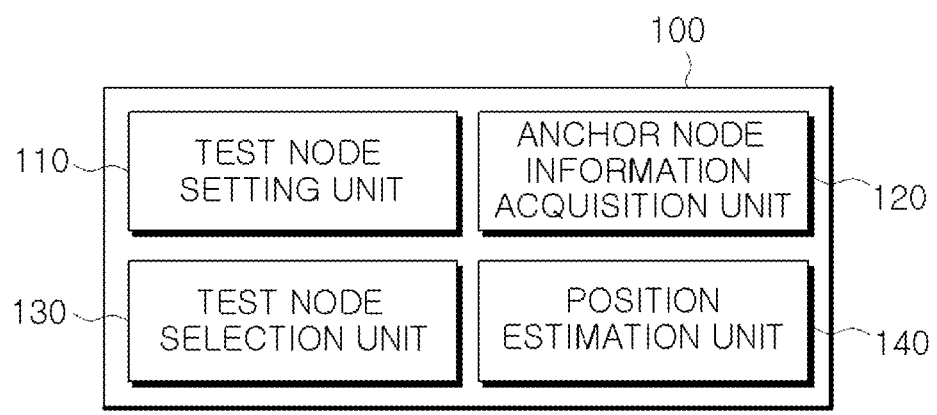
FIG. 1 is a diagram illustrating a configuration of a wireless positioning device according to an embodiment of the present invention.

FIG. 1 is a diagram illustrating a configuration of a wireless positioning device according to an embodiment of the present invention. A wireless positioning device 100 according to the embodiment of the present invention is a device that estimates a position of a unknown node to be positioned by using a plurality of anchor nodes arranged at regular intervals and can correspond to a wireless positioning server.

Referring to FIG. 1, the wireless positioning device 100 includes a test node setting unit 110, an anchor node information acquisition unit 120, a test node selection unit 130, and a position estimation unit 140.

The test node setting unit 110 sets a plurality of test nodes at uniform intervals on a space formed by the plurality of anchor nodes. The test node setting unit 110 maps and stores the number and position coordinates of the anchor nodes within a set distance from the test node, for each of the plurality of test nodes.

The anchor node information acquisition unit 120 acquires position coordinates of the anchor nodes within the set distance from the unknown node, respectively. The unknown node means a node to be positioned (a node whose position is desired to be known).

The test node selection unit 130 compares the position coordinates of each of the acquired anchor nodes and the coordinates of the anchor node mapped to the test nodes and selects the test nodes in which the number of position coordinates of the anchor nodes matching each other among the plurality of test nodes is greater than or equal to a threshold.

The location estimation unit 140 estimates a location of the unknown node by using the location coordinates of the selected test nodes.

Figure 2:
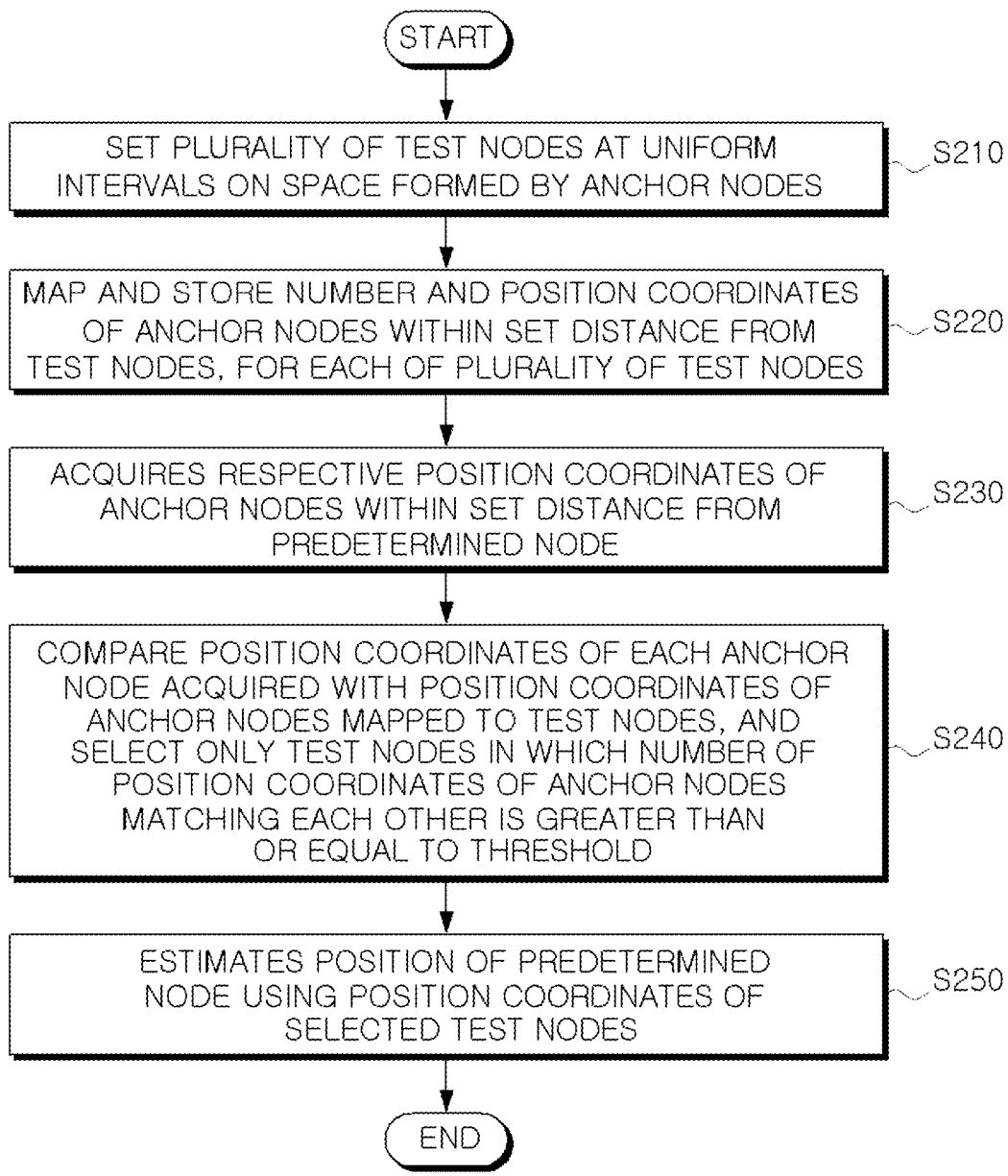
FIG. 2 is a diagram illustrating a wireless positioning method which uses the device of FIG. 1.

FIG. 2 is a diagram illustrating a wireless positioning method which uses the device of FIG. 1. Hereinafter, the wireless positioning method according to the present embodiment will be described in detail with reference to FIG. 1 and FIG. 2.

First, the test node setting unit 110 sets a plurality of test nodes at uniform intervals on a space formed by a plurality of anchor nodes arranged at regular intervals (S210).

A wireless sensor network environment considered in the embodiment of the present invention will be described as follows for the description of step S210.

Figure 3:
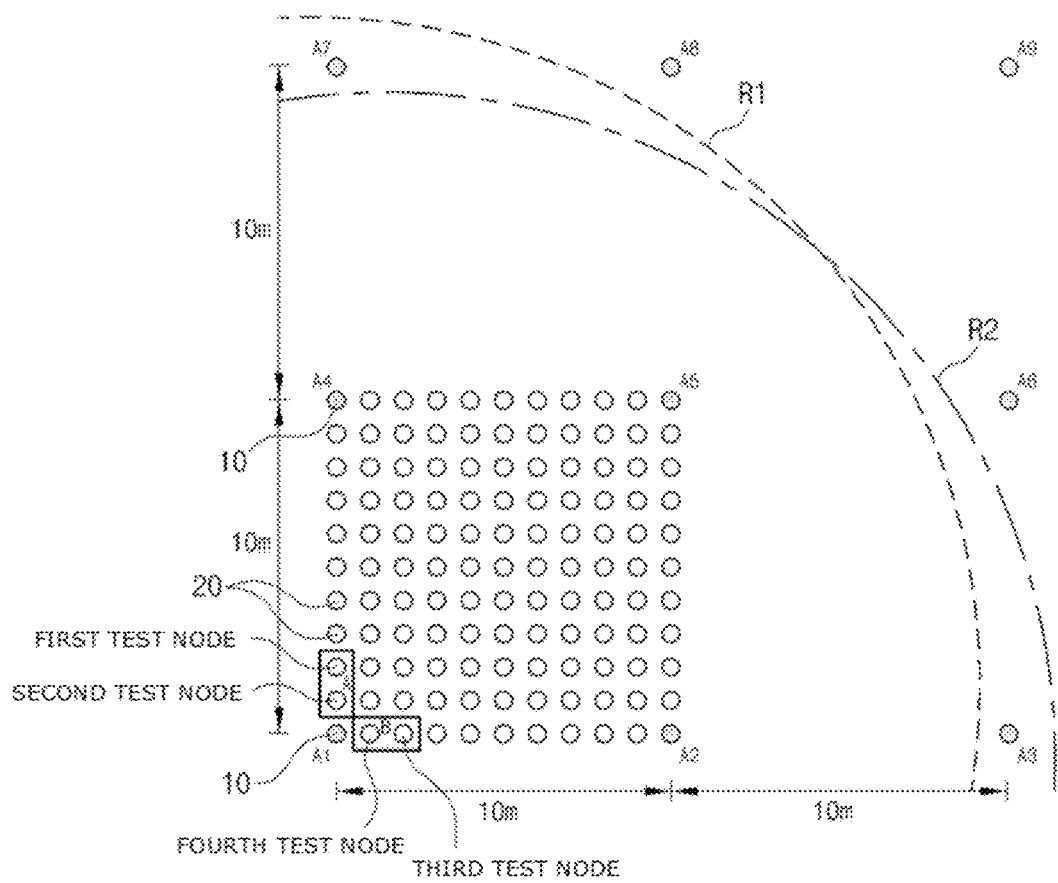
FIG. 3 is a diagram exemplifying a configuration of a square wireless sensor network including a plurality of anchor nodes for an embodiment of the present invention.

FIG. 3 is a diagram exemplifying a configuration of a square wireless sensor network including the plurality of anchor nodes for an embodiment of the present invention.

The wireless sensor network environment has a square space of 100×100 m$^2$, and the respective anchor nodes 10 are arranged at intervals of 10 m in the space. FIG. 3 illustrates only some anchor nodes for the sake of convenient explanation.

The plurality of test nodes 20 are arranged at intervals of 1 m in a space of 10×10 m$^2$ formed by the anchor nodes 10. Only four anchor nodes 10 are illustrated at four corner points in the space of 10×10 m for the sake of convenient explanation.

After the test nodes 20 are set as described above, the test node setting unit 110 maps and stores the number and position coordinates of the anchor nodes within the set distance from the test nodes, for each of the plurality of test nodes (S220).

Here, the set distance means an RSS-based reception distance radius R. For example, if a strength of a signal received from a specific anchor node on the test node is greater than or equal to a threshold, it indicates that the specific anchor node is within the set distance (reception distance radius) from the test node.

Accordingly, the anchor node within a set distance from the test node means an anchor node in which the strength of the signal received from the test node is greater than or equal to the threshold among the plurality of anchor nodes. In the same principle as this, the anchor node within a set distance from a unknown node to be positioned means an anchor node in which the strength of the signal received from the unknown node among the plurality of anchor nodes is greater than or equal to the threshold.

If a case where the reception distance radius R is 20 m is exemplified a for the sake of convenient explanation, in FIG. 3, five anchor nodes A1, A2, A4, A5, and A7 exist within the radius R (R1) on the basis of a first test node located in an A region, and the same is applied to a second test node. In the same principle, if a unknown node is located somewhere in the A region, five anchor nodes which is the same as described above exist within the radius R on the basis of the unknown node.

In addition, the five anchor nodes A1, A2, A3, A4, and A5 exist within the radius R (R2) on the basis of a third test node located in a region B, and the same is applied to the fourth test node. In a case of the nodes in the region A and the region B, the number of anchor nodes within the reception distance radius is 5 which is the same as described above, but the position coordinates of the anchor nodes are not identical to each other in part.

In this manner, the number and position coordinates of anchor nodes within the set distance and can be checked for each of the test nodes, and based on this, the test node setting unit 110 maps in advance and stores the number and position coordinates of the anchor nodes within the set distance from the test node 10.

Figure 4:
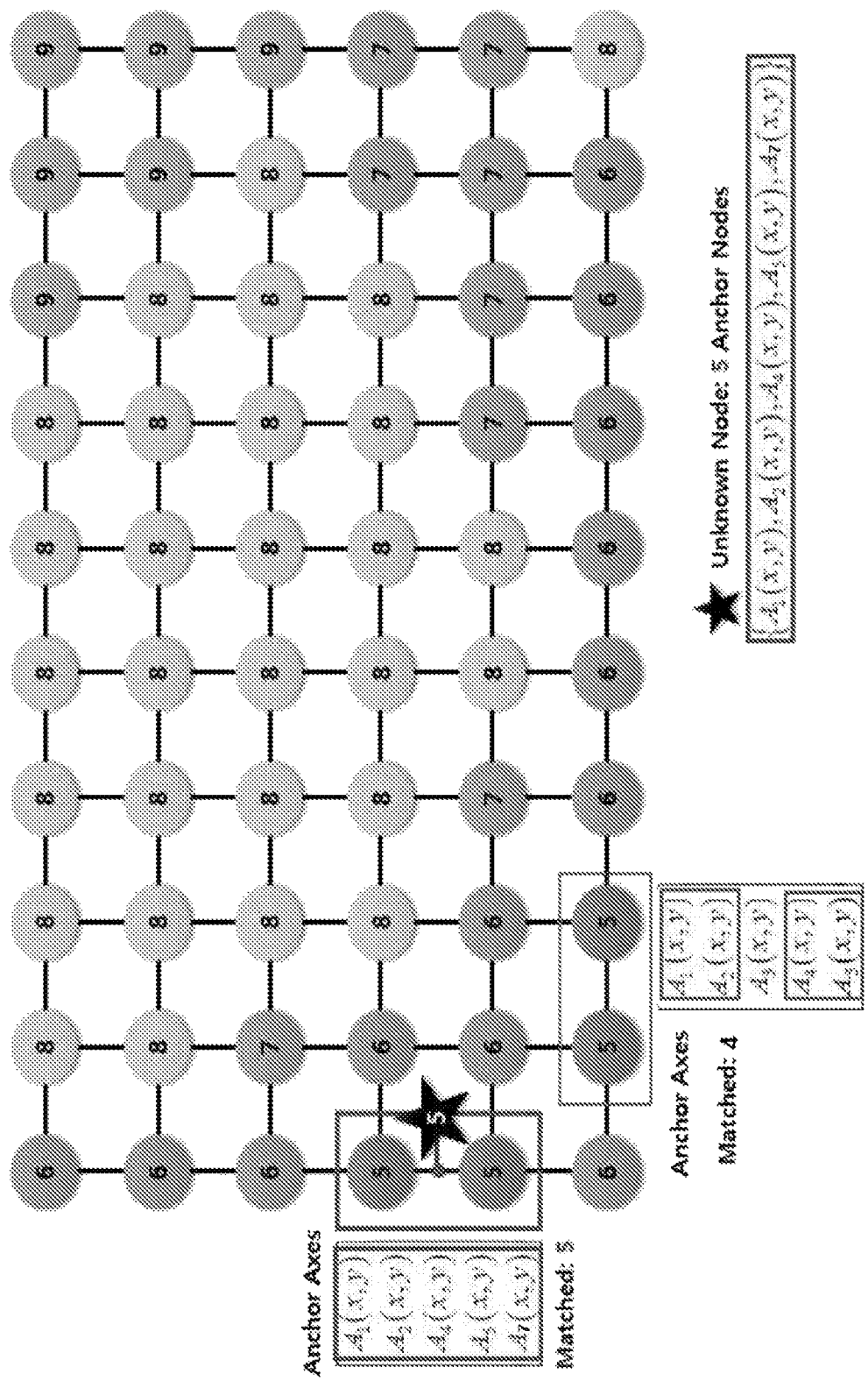
FIG. 4 is a diagram illustrating results of numbering and mapping the number of anchor nodes for each test node in the embodiment of the present invention.

FIG. 4 is a diagram illustrating results of numbering and mapping the number of anchor nodes for each test node in the embodiment of the present invention. FIG. 4 illustrates only a partial region of FIG. 3 for the sake of convenient explanation. In FIG. 4, numbers corresponding to the number of anchor nodes within the set distance are mapped to the respective test nodes.

Five anchor nodes A1, A2, A4, A5, and A7 exist in the set distance on the basis of a unknown node located in the A region. It can be seen that all of the five anchor nodes mapped to the first and second test nodes are matched (matched: 5).

However, If the five anchor nodes acquired from the unknown node are compared with the five anchor nodes mapped to the third and fourth test nodes in the B region, it can be seen that only four of the five anchor nodes are matched (matched: 4).

Here, in the method of related art, only the coordinates of the first and second test nodes in which the number of anchor nodes and the position coordinates are perfectly matched are averaged to estimate a position of the unknown node.

However, according to the embodiment of the present invention, even if the positions of the anchor nodes are not perfectly matched, the position of the unknown node is estimated by utilizing all of the coordinates of test nodes determined to have a positional similarity to the unknown node greater than or equal to a threshold, and thus, positioning performance is increased.

For example, in addition to the coordinates of the first and second test nodes, coordinates of the third and fourth test nodes and other peripheral test nodes may all be utilized. Furthermore, by assigning differently weighted values to the coordinates of the test nodes in accordance with the positional similarities, reliability and accuracy of positioning are increased.

Hereinafter, steps S230 to S250 in which actual positioning processes of the unknown node are proposed will be described in more detail.

First, the anchor node information acquisition unit 120 acquires the respective position coordinates of the anchor nodes within the set distance from the unknown node to be positioned (S230). Information of the anchor nodes within the set distance from the unknown node is acquired based on the RSS value as described above.

Then, the position coordinates of each anchor node acquired from the unknown node are compared with the position coordinates of the anchor nodes mapped to the test nodes, and only the test nodes in which the number of the position coordinates of the anchor nodes matching to each other is greater than or equal to a threshold are selected (S240).

Figure 5:
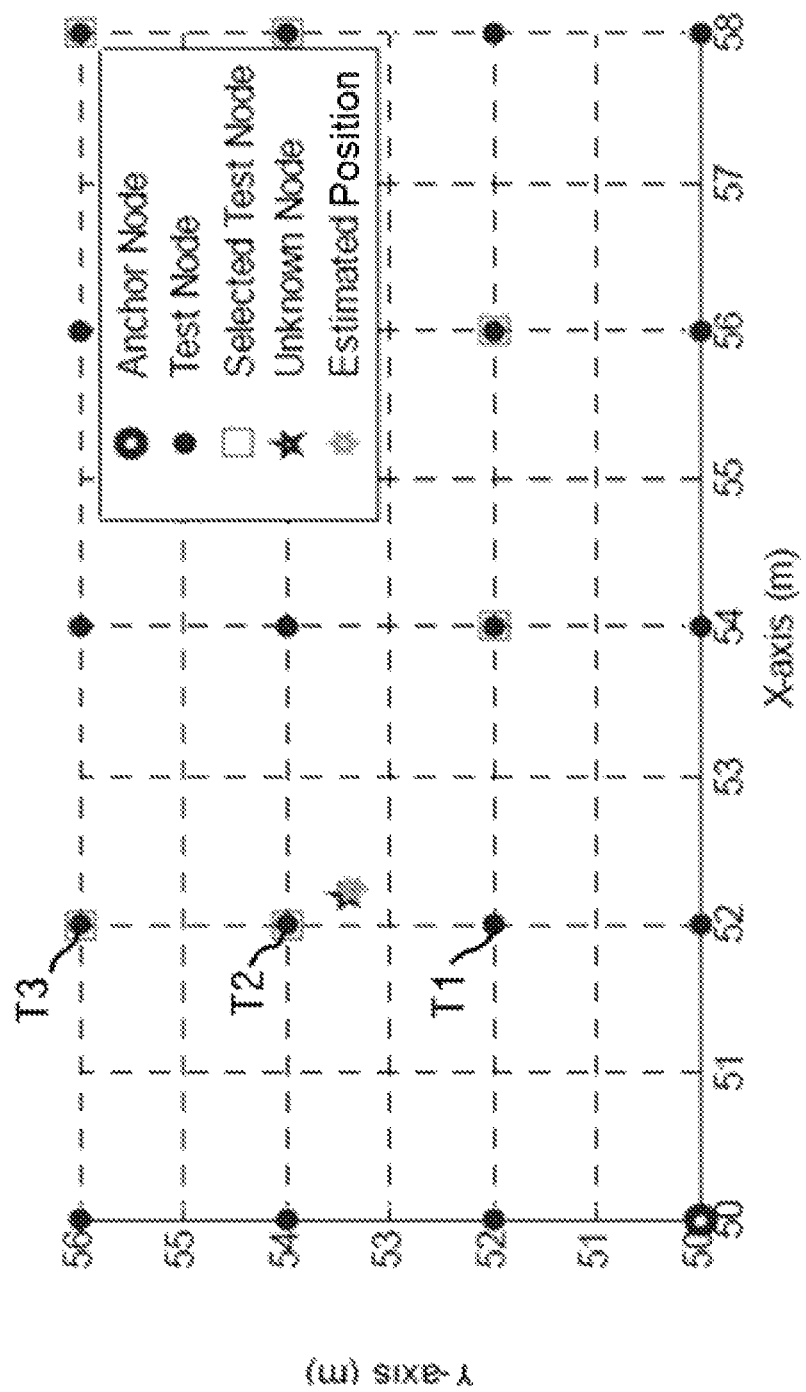
FIG. 5 is a diagram illustrating a selection process of the test node in an embodiment of the present invention.

FIG. 5 is a diagram illustrating a selection process of the test node in the embodiment of the present invention. FIG. 5 illustrates only a partial region of the wireless sensor network for the sake of convenient description and illustrates only one anchor node. FIG. 5 exemplifies that a distance between test nodes is 2 m.

In addition, for the sake of convenient description, it is assumed that there are five anchor nodes existing within the set distance from the unknown node U in FIG. 5, and the position coordinates of the respective anchor nodes are simply a1, a2, a3, a4, and a5.

Data considered in the selection process of the test node is illustrated in Table 1 below.

TABLE 1

| Test-Node Number | X-Axis | Y-Axis | Count1 (Anchor) c1 | Count2 (Intersect) c2 | $T_{th}$ |
|---|---|---|---|---|---|
| ... | ... | ... | ... | ... | ... |
| 1353(T1) | 52 | 52 | 6 | 3 | 4 |
| 1354(T2) | 52 | 54 | 5 | 5 | 3 |
| 1355(T3) | 52 | 56 | 5 | 4 | 3 |
| 1356(T4) | 54 | 52 | 5 | 4 | 3 |
| 1357(T5) | 54 | 54 | 4 | 1 | 2 |
| ... | ... | ... | ... | ... | ... |

Table 1 illustrates the number of test nodes, position coordinates X and Y of the test nodes, the number c1 of anchor nodes mapped to the test nodes, the number c2 of the matched position coordinates when comparing with the position coordinates of the anchor nodes within the set distance from the unknown node, and the threshold $T_{th}$, for each test node.

In Table 1, briefly, c1 denotes the number of anchor nodes within the set distance from the test node, and c2 denotes the number of the matched position coordinates of the anchor nodes. The 1353th to 1357th test nodes are named T1 to T5, respectively. Among the test nodes, T1 and T3 are exemplified as follows.

Assuming that the number of anchor nodes (anchor nodes within the set distance from T1) mapped to the test node T1 is 6 (c1=6) and coordinates of the corresponding anchor nodes are a1, a2, a4, a7, a8, and a9, coordinates that match the coordinates a1, a2, a3, a4, and a5 of the anchor nodes obtained from the unknown node U are total three coordinates (c2=3) including a1, a2, and a4.

Assuming that the number of anchor nodes mapped to the test node T2 is 5 (c1=5) and coordinates of the corresponding anchor nodes are a1, a2, a3, a4 and a5, coordinates that match the coordinates of the anchor nodes obtained from the unknown node U are total five coordinates (c2=5) including a1, a2, a3, a4, and a5. At this time, the coordinates of the anchor nodes from U1 and T1 are all matched each other, and thus, c1=c2.

Subsequently, assuming that the number of anchor nodes mapped to the test node T3 is total five coordinates (c1=5) and coordinates of the corresponding anchor nodes are a1, a2, a3, a4, and a6, coordinates that match the coordinates of the anchor nodes obtained from the unknown node U are total four coordinates (c2=4), including a1, a2, a3, and a4.

Here, in order to estimate a position of the unknown node, test nodes satisfying a condition that c2 is greater than or equal to the threshold $T_{th}$ among the plurality of test nodes have to be selected.

The threshold $T_{th}$ is set for each of the plurality of test nodes and is set to a value obtained by subtracting a predetermined common constant $A_{th}$ from the number c2 of anchor nodes mapped to the test node as represented by Equation 1 below.

$$T_{th}=(c_1-A_{th}) \quad \text{[Equation 1]}$$

When the common constant $A_{th}$=2, the threshold $T_{th}$ applied to the test node T1 is "4" (=6-2), the threshold $T_{th}$ applied to T2, T3, and T4 is "3" (=5-2), and the threshold $T_{th}$ applied to T5 is "2" (=4-2).

At this time, since "c2≥$T_{th}$'" is satisfied in a case of the test nodes T2, T3, and T4, T2, T3, and T4 are selected in step S240, and T1 and T5 are not selected. In step S240, such a method is applied to all the test nodes, and thereby, only the test nodes satisfying the condition are selected. Substantially, step S240 illustrates a process of selecting test nodes satisfying a condition of $T_{th}$ c2≤c1.

Thereafter, the position estimation unit 140 estimates a position of the unknown node by using position coordinates of the selected test nodes (S250). At this time, the position of the unknown node is estimated based on a value obtained by applying each weighted value to the position coordinates of the selected test nodes, and a specific operation expression is represented by following Equation 2.

$$P(x, y) = \frac{\sum_{j=1}^{N} w_j T_j(x, y)}{\sum_{j=1}^{N} w_j} \quad \text{[Equation 2]}$$

Here, P(x,y) denotes a position of the unknown node, $T_j(x,y)$ denotes position coordinates of the jth test node among the selected test nodes, N denotes the number of the selected test nodes, and W denotes a weighted value applied to the jth test node.

The weight $W_j$ is calculated as c2/c1 and has a range of 0≤$W_j$≤1. For example, the weighted value of "1" (=5/5) is applied to the coordinates of the selected test node T2, and the weighted value of "4/5" is applied to the coordinates of T3 and T4, respectively. Here, the larger the weighted value, the higher a positional correlation with the unknown node.

As described above, according to the embodiment of the present invention, the position of the unknown node is estimated by using a method of selecting the test nodes in which the positional correlation with the unknown node is greater than or equal to a threshold among the plurality of test nodes, individually multiplied the position coordinates of the selected test nodes by the weighted values proportional to the respective correlations, summing all the position coordinates multiplied by the weighted values, and dividing the summed position coordinate value by the sum of all the weighted values.

Hereinafter, simulation results for analyzing performance of the wireless positioning method according to the present embodiment will be described. A simulation space of a square space of 100×100 m² was considered. It is assumed that absolute positions of the anchor nodes performing the wireless positioning in the WSN is already known and the anchor nodes are uniformly arranged at intervals of 10 m in a two-dimensional plane having the same height.

Unknown nodes to be positioned are randomly arranged in the space. It is assumed that the unknown nodes know the number and coordinates of the anchor nodes existing within a maximum reception distance limit (set distance), based on RSS of a signal transmitted from the anchor node. In the following, the maximum reception distance limit, that is, the set distance is named $d_m$.

A performance index is a Mean Distance Error (MDE) and intervals between the test nodes were considered to be 1 m, 2 m, and 4 m. Three and five specific constants (common constants) $A_{th}$ for the threshold $T_{th}$ was considered.

Figure 6:
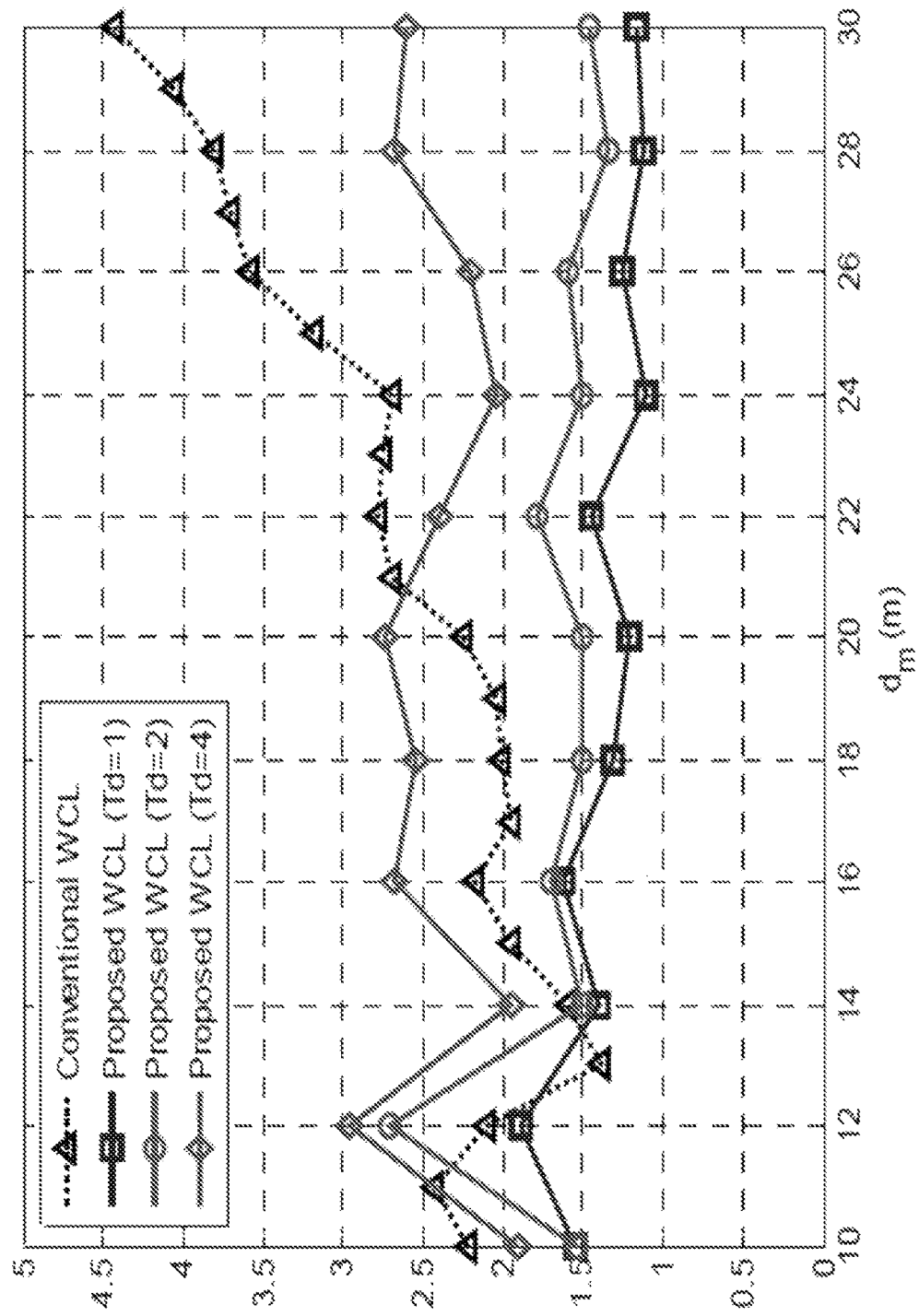
FIG. 6 is a graph illustrating comparison of wireless positioning performance according to spacing of the test nodes in the wireless sensor network.

FIG. 6 is a graph illustrating comparison of the wireless positioning performance according to spacing of the test nodes in a wireless sensor network. A horizontal axis denotes the maximum reception distance limit ($d_m$; m) and a vertical axis denotes an average distance error (MDE; m).

As illustrated in FIG. 6, in a case of the embodiment of the present invention, when an interval $T_d$ between the test nodes is relatively dense, the wireless positioning performance is improved as compared with a general WCL algorithm. In addition, according to the embodiment of the present invention, even if dm increases, a low error is maintained unlike the method of related art, and thus, it can be seen that stable wireless positioning performance can be provided, and in a case where $T_d$=4 m, the wireless positioning performance is improved more than the general WCL algorithm when $d_m$ is greater than or equal to 22 m.

Figure 7:
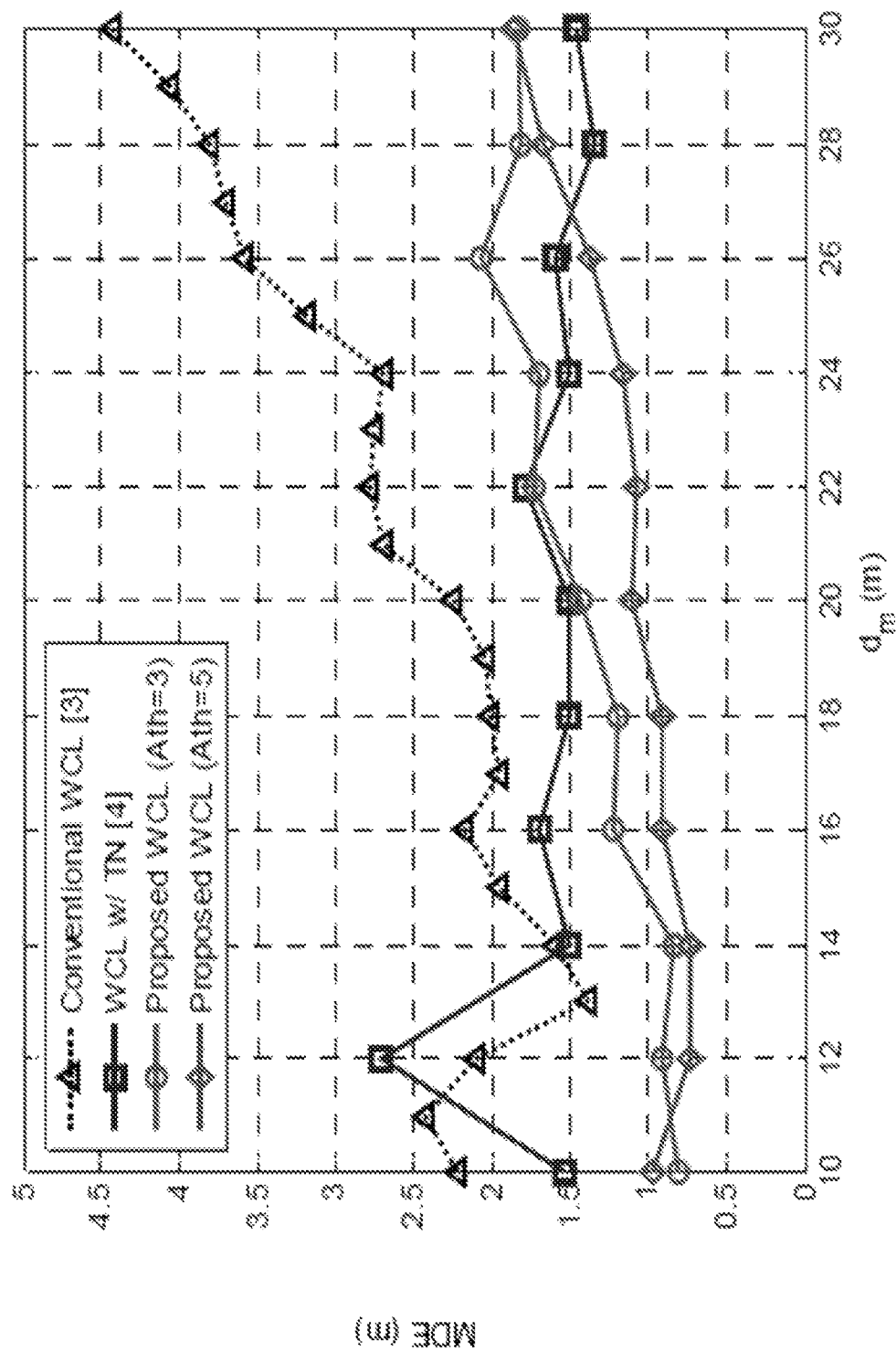
FIG. 7 is a graph illustrating comparison of the wireless positioning performance when an interval between the test nodes is 2 m.

FIG. 7 is a graph illustrating comparison of the wireless positioning performance when an interval between the test nodes is 2 m. A horizontal axis denotes the maximum reception distance limit ($d_m$; m) and a vertical axis denotes the average distance error (MDE; m).

In the embodiment of the present invention, when the threshold $T_{th}$ used for selecting the test node is set, the specific constant $A_{th}$ is used as represented by Equation 1. As $A_{th}$ increases, a threshold decreases and the number of test nodes to be selected increases. A weighted valued is applied to the position coordinates of the selected test nodes, and a high weighted value is applied to the position coordinates with a high importance.

Referring to the results of FIG. 7, it can be seen that the wireless positioning performance is improved as the specific constant $A_{th}$ for setting the threshold $T_{th}$ increases. This is because when $A_{th}$ is lowered, the threshold increases, the number of test nodes actually selected for positioning is substantially reduced, and thereby, the positioning performance is relatively reduced.

According to the present invention described above, it is possible to improve wireless positioning performance by estimating a position of a unknown node, based on coordinates of test nodes having a positional correlation, and to provide more reliable and highly accurate positioning information by assigning a higher weighted value to the coordinates of the test nodes having a high correlation. In addition, the present invention does not require a large number of hardware so as to grasp spacing of the optimal test nodes, and thus, it is possible to provide an economical wireless positioning technology with low complexity of a system.

The present invention has been described with reference to embodiments illustrated in the drawings, the embodiments are exemplary, and it will be understood by those skilled in the art that various modifications and equivalent embodiments are possible from the embodiments. Accordingly, the true technical protection scope of the present invention should be determined by the technical idea of the appended claims.

The invention claimed is:

1. A wireless positioning method comprising the steps of:
   mapping and storing the number and position coordinates of anchor nodes, which are within a set distance from a test node, for each of a plurality of test nodes set at uniform intervals in a space formed by a plurality of anchor nodes;
   acquiring respective position coordinates of the anchor nodes which are within the set distance from a unknown node to be positioned;
   comparing each of the acquired position coordinates of the anchor nodes and the position coordinates of the anchor nodes mapped to the test nodes so as to select the test nodes of which the number of position coordinates of the anchor nodes matching each other is greater than a threshold; and estimating a position of the unknown node by using the position coordinates of the selected test nodes.

2. The wireless positioning method of claim 1, wherein the threshold is set for each of the plurality of test nodes and is set to a value that is obtained by subtracting a predetermined common constant from the number of anchor nodes which are mapped to the test nodes.

3. The wireless positioning method of claim 2, wherein the step of estimating the position of the unknown node estimates the position of the unknown node, based on a value that is obtained by applying respective weighted values to the position coordinates of the selected test nodes as represented by a following equation:

$$P(x, y) = \frac{\sum_{j=1}^{N} w_j T_j(x, y)}{\sum_{j=1}^{N} w_j}$$

wherein P(x,y) denotes the position of the unknown node, $T_j$(x,y) denotes position coordinates of a jth test node among the selected test nodes, N denotes the number of the selected test nodes, $W_j$ denotes a weighted value that is applied to the jth test node.

4. The wireless positioning method of claim 3, wherein the weighted value is calculated by c2/c1, c1 denotes the number of anchor nodes within the set distance from the test node, and c2 denotes the number of position coordinates of the anchor nodes matching each other.

5. The wireless positioning method of claim 1, wherein the anchor nodes within the set distance from the unknown node correspond to anchor nodes in which a strength of a signal that is received from the unknown node among the plurality of anchor nodes is greater than or equal to the threshold.

6. A wireless positioning device comprising:

a test node setting unit that maps and stores the number and position coordinates of anchor nodes, which are within a set distance from a test node, for each of a plurality of test nodes set at uniform intervals in a space formed by a plurality of anchor nodes;

an anchor node information acquisition unit that acquires respective position coordinates of the anchor nodes which are within the set distance from a unknown node to be positioned;

a test node selection unit that compares each of the acquired position coordinates of the anchor nodes and the position coordinates of the anchor nodes mapped to the test nodes so as to select the test nodes of which the number of position coordinates of the anchor nodes matching each other is greater than a threshold; and a position estimation unit that estimates a position of the unknown node by using the position coordinates of the selected test nodes.

7. The wireless positioning device of claim 6, wherein the threshold is set for each of the plurality of test nodes and is set to a value that is obtained by subtracting a predetermined common constant from the number of anchor nodes which are mapped to the test nodes.

8. The wireless positioning device of claim 7, wherein the position estimation unit estimates the position of the unknown node, based on a value that is obtained by applying respective weighted values to the position coordinates of the selected test nodes as represented by a following equation:

$$P(x, y) = \frac{\sum_{j=1}^{N} w_j T_j(x, y)}{\sum_{j=1}^{N} w_j}$$

wherein P(x,y) denotes the position of the unknown node, $T_j$(x,y) denotes position coordinates of a jth test node among the selected test nodes, N denotes the number of the selected test nodes, $W_j$ denotes a weighted value that is applied to the jth test node.

9. The wireless positioning device of claim 8, wherein the weighted value is calculated by c2/c1, c1 denotes the number of anchor nodes within the set distance from the test node, and c2 denotes the number of position coordinates of the anchor nodes matching each other.

10. The wireless positioning device of claim 6, wherein the anchor nodes within the set distance from the unknown node correspond to anchor nodes in which a strength of a signal that is received from the unknown node among the plurality of anchor nodes is greater than or equal to the threshold.

\* \* \* \* \*